(12) United States Patent
O'Dea

(10) Patent No.: US 7,668,637 B2
(45) Date of Patent: Feb. 23, 2010

(54) TECHNIQUE FOR DETERMINING MOTOR VEHICLE SLIP ANGLE WHILE ACCOUNTING FOR ROAD BANKS

(76) Inventor: Kevin Austin O'Dea, 3137 Earlmoore La., Ann Arbor, MI (US) 48105

(*) Notice: Subject to any disclaimer, the term of this patent is extended or adjusted under 35 U.S.C. 154(b) by 920 days.

(21) Appl. No.: 11/187,491

(22) Filed: Jul. 22, 2005

(65) Prior Publication Data
US 2007/0021896 A1 Jan. 25, 2007

(51) Int. Cl.
G05D 5/00 (2006.01)
B60T 8/24 (2006.01)

(52) U.S. Cl. .............. 701/72; 701/94; 701/38; 303/140; 303/146

(58) Field of Classification Search ............... 701/72, 701/38, 94; 303/140, 146, 147
See application file for complete search history.

(56) References Cited

U.S. PATENT DOCUMENTS

| | | | |
|---|---|---|---|
| 5,371,677 A | 12/1994 | Ehret et al. | |
| 5,711,023 A | 1/1998 | Eckert et al. | |
| 5,899,952 A | 5/1999 | Fukada | |
| 6,035,251 A | 3/2000 | Hac et al. | |
| 6,161,905 A | 12/2000 | Hac et al. | |
| 6,195,606 B1 | 2/2001 | Barta et al. | |
| 6,233,513 B1 | 5/2001 | Furukawa et al. | |
| 6,304,805 B1 | 10/2001 | Onogi | |
| 6,351,694 B1* | 2/2002 | Tseng et al. ............... 701/1 | |
| 6,456,920 B1 | 9/2002 | Nishio et al. | |
| 6,546,920 B1 | 4/2003 | Kawamura et al. | |
| 6,547,343 B1 | 4/2003 | Hac | |
| 2005/0080542 A1* | 4/2005 | Lu et al. ............... 701/70 | |

(Continued)

FOREIGN PATENT DOCUMENTS

EP 0734939 9/2002

OTHER PUBLICATIONS

Akitaka Nishio Kenji Tozu, Hiroyuki Yamaguchi, Katsuhiro Asano, and Yasushi Amano, "Development of Vehicle Stability Control System Based on Vehicle Sideslip Angle Estimation," Mar. 5-8, 2001 (10 pages).

(Continued)

Primary Examiner—Khoi Tran
Assistant Examiner—Brian J Broadhead
(74) Attorney, Agent, or Firm—William H. Honaker; Dickinson Wright PLLC

(57) ABSTRACT

A technique for determining a slip angle of a motor vehicle, while compensating for bank angle of the motor vehicle, includes a number of steps. Initially, a first lateral velocity of a motor vehicle is determined, without consideration of a bank angle and is derived from an integral of a first lateral velocity derivative (vy dot). A second lateral velocity of the motor vehicle is also determined, with consideration of the bank angle and is derived from an integral of a second lateral velocity derivative. A third lateral velocity of the motor vehicle is also determined, with consideration of the bank angle and the first and second lateral velocities and is derived from an integral of a third lateral velocity derivative. A longitudinal velocity of the motor vehicle is also determined. A slip angle of the motor vehicle is then determined, based upon the third lateral velocity and the longitudinal velocity or the first lateral velocity and the longitudinal velocity.

20 Claims, 3 Drawing Sheets

U.S. PATENT DOCUMENTS

2006/0085112 A1* 4/2006 Lu et al. .................. 701/38
2007/0005212 A1* 1/2007 Xu et al. .................. 701/70
2008/0086251 A1* 4/2008 Lu et al. .................. 701/70

OTHER PUBLICATIONS

A.T. van Zanten, "Bosch ESP Systems: 5 Years of Experience," May 15-17, 2000 (11 pages).

Anton T. van Zanten, Rainer Erhardt, Georg Pfaff, Friedrich Kost, Uwe Hartmann, and Thomas Ehret, "Control Aspects of the Bosch-VDC," Jun. 24-28, 1996 (36 pages).

Shoji Inagaki, Ikuo Kshiro, and Masaki Yamamoto, "Analysis on Vehicle Stability in Critical Cornering Using Phase-Plane Method," Oct. 1994 (pp. 287-292).

Keiyu Kin, Hironobu Kiryu, Tohru Ikeda, and Osamu Yano, "Enhanced Vehicle Stability and Steerability with VSA," (undated), (pp. 1-6).

* cited by examiner

TECHNIQUE FOR DETERMINING MOTOR VEHICLE SLIP ANGLE WHILE ACCOUNTING FOR ROAD BANKS

TECHNICAL FIELD

The present invention is generally directed to determining a slip angle of a motor vehicle and, more specifically, to determining a motor vehicle slip angle while accounting for road banks.

BACKGROUND OF THE INVENTION

Various active control systems have been proposed and/or implemented that have controlled the brakes, steering and/or suspension of a motor vehicle to better allow a driver of the motor vehicle to maintain control of the vehicle under varying circumstances and conditions. In general, these control systems have attempted to improve motor vehicle performance in various driving conditions by coordinating control of multiple vehicle subsystems. Typically, such control systems have utilized a reference model, a state estimator and a vehicle control unit, which has incorporated feedback control in conjunction with feedforward control.

Similarly, a number of active control systems have been proposed to reduce the likelihood of motor vehicle rollover. In general, the design of these systems has been based on roll state dynamics. Typically, yaw rate stability control systems have been designed with consideration for yaw-plane motion and have ignored roll motion. Additionally, rollover stability control systems have been designed for roll motion and have ignored yaw-plane motion. In general, brake-based control designers have experienced difficulty in developing a strategy that coordinates rollover and yaw stability.

A number of motor vehicles have included electronic stability control (ESC), which is a closed-loop stability control system that relies on antilock brake system (ABS) and traction control system (TCS) components. A typical ESC system incorporates sensors for determining vehicle states, as well as an electronic control unit (ECU) to modulate braking and traction forces responsive to signals provided by the sensors. Various ESC systems have included wheel speed sensors, a steering wheel angle sensor, yaw rate and lateral acceleration sensors and master cylinder pressure sensors.

In general, the steering wheel angle sensor has provided a steering wheel angle and a steering input rate. The wheel speed sensors have provided signals that the ECU uses to compute the speed of the wheels. Typically, the vehicle speed is derived from the rotational speeds of all wheels using a computational algorithm. The yaw rate sensor has usually been implemented as a gyroscopic sensor that monitors a rotation about a vertical axis of the motor vehicle. The lateral acceleration sensor has been positioned to measure the acceleration of the vehicle in the direction of the lateral axis of the vehicle, i.e., the side-to-side motion of the vehicle. In a typical ESC system, the ECU includes a microprocessor that processes and interprets the information from each of the sensors and then generates necessary activation commands to control brake pressure and engine torque.

The concept behind an ESC system is to provide an active safety system that helps a motor vehicle operator prevent skidding that can occur in various kinds of weather, on different types of roads and in situations where even expert drivers may struggle to maintain their vehicles on the roadway. The stabilizing effect provided by an ESC system is based on calculations performed by the microprocessor of the ECU, which evaluates signals provided from the various sensors. The microprocessor utilizes the information provided by the sensors to continuously compare the actual and desired movement of the vehicle and intervene if the vehicle shows a tendency to leave an intended travel path. The ESC stabilizing effect is achieved by automatically applying a differential brake force (i.e., a difference between the left side and right side longitudinal braking forces), which affects the turning motion of the vehicle and helps to keep it on the intended path.

Typically, a control algorithm implemented by the microprocessor utilizes program setpoints, which are tailored to a particular vehicle and specific operations of the vehicle. The microprocessor of the ESC system then transmits appropriate commands to the braking system, to cause the braking system to provide a defined brake pressure at an appropriate wheel, depending upon the deviation of the motor vehicle from a desired path. The microprocessor may also command the vehicle to reduce engine torque during understeering or when wheel spin is detected during acceleration.

In this manner, an ESC system attempts to control the yaw rate and the slip angle of an associated vehicle. In general, the slip angle of a motor vehicle is difficult to measure, even with expensive sensors, and, as such, slip angle has usually been estimated. Typically, the slip angle has been estimated by using some type of observer model or by integrating a side slip rate. Unfortunately, current integration techniques have not properly accounted for sensor bias, sensor noise and/or banked road surfaces. While observer models are less susceptible to sensor related bias and noise, observer models may experience difficulty with banked roads, due to, for example, difficulty in accurately estimating tire forces.

What is needed is an accurate technique for estimating motor vehicle slip angle that accounts for banked roads.

SUMMARY OF THE INVENTION

The present invention is directed to a technique for determining a slip angle of a motor vehicle, while compensating for bank angle of the motor vehicle. Initially, a first lateral velocity of a motor vehicle is determined. The first lateral velocity is calculated without consideration of a bank angle and is derived from an integral of a first lateral velocity derivative (vy dot). A second lateral velocity of the motor vehicle is also determined. The second lateral velocity is calculated with consideration of the bank angle and is derived from an integral of a second lateral velocity derivative. A third lateral velocity of the motor vehicle is also determined. The third lateral velocity is calculated with consideration of the bank angle and the first and second lateral velocities and is derived from an integral of a third lateral velocity derivative. A longitudinal velocity of the motor vehicle is also determined. A slip angle of the motor vehicle is then determined, based upon the third lateral velocity and the longitudinal velocity, when a difference between the first lateral velocity and the second lateral velocity is greater than a lateral velocity threshold and the bank angle is greater than a bank angle threshold. The slip angle is determined, based upon the first lateral velocity and the longitudinal velocity, when a difference between the first lateral velocity and the second lateral velocity is less than the lateral velocity threshold or the bank angle is less than the bank angle threshold.

According to another embodiment of the present invention, the first, second and third lateral velocities are reset, when the longitudinal speed is less than a predetermined speed threshold for a predetermined time period. According to another aspect of the present invention, the first, second and third lateral velocities are reset, when a yaw rate of the motor vehicle is less than a predetermined yaw rate threshold, a yaw acceleration of the motor vehicle is less than a predetermined yaw acceleration threshold and a steering angle of the motor vehicle is less than a predetermined steering angle threshold for the predetermined time period.

According to another embodiment of the present invention, the predetermined yaw rate threshold is about 3 degrees per second, the predetermined yaw acceleration threshold is about 100 degrees per second squared, the predetermined steering angle threshold is about 30 degrees and the predetermined time period is about 1 second. According to another aspect of the present invention, the first, second and third lateral velocities are only determined when a corresponding one of the lateral velocity derivatives of the motor vehicle is greater than a predetermined lateral velocity derivative threshold. According to a different aspect of the present invention, the first, second and third lateral velocities are only determined when a corresponding one of the lateral velocity derivatives of the motor vehicle is in an opposite direction of the first, second and third lateral velocities and a corresponding one of the lateral velocity derivatives is greater than an appropriate threshold.

According to another embodiment of the present invention, the first, second and third lateral velocities are reduced by a fixed amount if integration conditions for a corresponding one of the lateral velocities in the above paragraph are not met and the vehicle yaw rate is less than a predetermined yaw rate threshold.

According to another embodiment of the present invention, the first, second and third lateral velocities are unchanged if the conditions in the above two paragraphs are not met.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
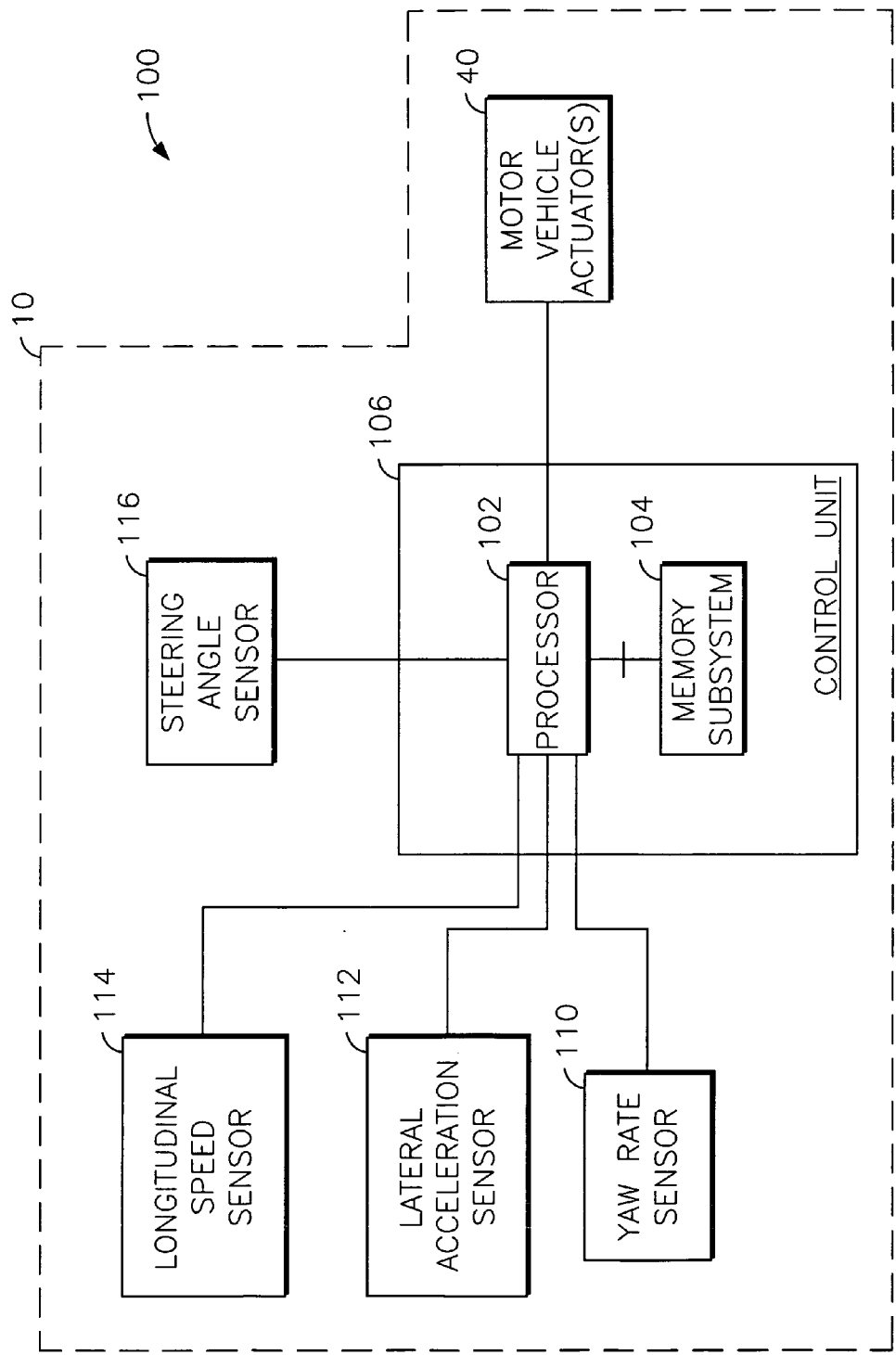
FIG. 1 depicts an exemplary electrical block diagram of an automotive system for controlling motion of a motor vehicle.

The present invention is generally directed to a system that estimates a motor vehicle slip angle ($\tan^{-1}(vy/vx)$) while taking into account banked roads. According to one embodiment of the present invention, a lateral velocity (vy) of the vehicle is determined by integrating the following equation:

$$vy\_dot = ay - vx \ast yaw\_rate.$$

where vy_dot corresponds to a change in lateral velocity (i.e., lateral velocity derivative) of the vehicle, ay is a measured lateral acceleration of the vehicle and yaw_rate corresponds to a measured yaw rate of the vehicle. According to one embodiment of the present invention, additional logic is implemented to improve the integration, which is subject to sensor bias conditions. That is, conditions are monitored and the integral is reset under certain conditions, according to the following exemplary routine:

```
if Vx < ke_vy_reset_low_spd OR
   (abs(yaw_rate) < ke_vy_reset_yaw AND
    abs(yaw_acceleration) < ke_vy_reset_yaw_acc AND
    abs(steering_angle) < ke_vy_reset_steer))
{
    vy_reset_timer++
}
else
{
    vy_reset_timer = 0
}
if (vy_reset_timer > ke_vy_reset_time)
{
    vy = 0 : first, second and third lateral velocities
    slip angle = 0
}
```

In the routine set forth above, Vx is the longitudinal speed of the motor vehicle, ke_vy_reset_low_spd is a longitudinal speed threshold, yaw_rate is the yaw rate of the vehicle (corrected for sensor bias), ke_vy_reset_yaw is a yaw rate threshold, yaw_acceleration is the yaw acceleration of the vehicle, ke_vy_reset_yaw_acc is a yaw acceleration threshold, steering angle is the steer angle of the vehicle (corrected for sensor bias), ke_vy_reset_steer is a steer angle threshold, vy_reset_timer is a counter that indicates when the slip angle should be reset to zero and ke_vy_reset_time is a timer threshold. It should be appreciated that the thresholds are assigned appropriate values for a given motor vehicle. For example, the longitudinal speed threshold ke_vy_reset_low_spd may be assigned a value of 5 kph, the yaw rate threshold ke_vy_reset_yaw may be assigned a value of 3 degrees/second, the yaw acceleration threshold ke_vy reset_yaw_acc may be assigned a value of 100 degrees/second/second, the steer angle threshold ke_vy_reset_steer may be assigned a value of 30 degrees and the timer threshold ke_vy_reset_time may be assigned a value of 1 second.

According to another aspect of the present invention, vy_dot is only integrated when it is greater than a certain value and of opposite sign than vy or simply greater than a certain value. This aids in the elimination of noise and biases from the integration. According to another aspect of the present invention, the lateral velocities of the vehicle are reduced each time step by a fixed amount if the change in the corresponding lateral velocity vy_dot falls within the deadband set forth below and the yaw rate of the vehicle is less than a threshold. According to yet another aspect of the present invention, the lateral velocities are left unchanged for an execution cycle if the preceding conditions are not met. A routine for implementing these aspects of the present invention may be constructed as follows:

```
if {[(vy > 0 AND vy_dot < 0) OR (vy < 0 AND vy_dot > 0)]
        AND
        abs(vy_dot) > ke_vy_lat_yaw_reject }
    OR
    (abs(vy_dot) > ke_vy_lat_yaw_reject1 )
{
    vy = vy + vy_dot
}
else
{
    if (abs(yaw_rate) < ke_yaw_steady_min)
    {
      if (vy > 0)
      {
```

```
        vy = vy − ke_min_vy_dec
    }
    else if (vy < 0)
    {
        vy = vy + ke_min_vy_dec
    }
}
else
{
    vy is unchanged.
}
}
```

It should be noted that, in the routine above, when the first if loop is executed, the lateral velocity vy and the change in lateral velocity vy_dot have opposite signs and, as such, adding vy and vy_dot decreases vy.

Another aspect of the present invention is to take into account banked surfaces, which can cause the integral of the lateral velocity vy to grow without bounds. A number of current ESC algorithms calculate a bank angle estimate, which is used in the following way to improve the above integration. A bank angle estimate may be achieved through the techniques described in U.S. Pat. Nos. 5,941,919 and 5,720,533, which are hereby incorporated herein by reference in their entirety. First, two integrations are calculated. The first integration does not use the bank angle estimate. The second integration is modified to include the bank angle estimate (as provided by the ESC algorithm), as is set forth below:

$vy\_dot\_bank = ay − vx*yaw\_rate − bank\_angel\_angle\_estimate$

These two integrations are compared against one another to determine if a bank is present. A bank is present if the two integrations diverge by a certain value. This divergence is checked periodically. A third integration is performed using the value which has been determined for the bank. A bank is unlearned when the bank estimate drops below a certain value. Also, the bank has to be of a certain magnitude to be used, otherwise, it is rejected as being too small to be considered. This is desirable because using the bank estimate all the time, which may be a slow moving washout filter, eliminates essential data on slow maneuvers. A routine for implementing the above-described functions may be implemented as follows:

```
vy_diff = abs(vy_bank − vy_no_bank)
bank_update_count++
if (bank_update_count == ke_bank_check_count)
{
  bank_update_count = 0
  if (bank = FALSE)
    AND
    (abs(Bank_Angle_Estimate) > ke_angle_bank))
    AND
    (abs(vy_diff) > ke_vy_diff_bank)
  {
    bank = TRUE
    angle = Bank_Angle_Estimate
  }
  else if (bank = TRUE)
    AND
    ((vy_final == 0 AND vy_bank == 0)
     OR
     angle == 0)
  {
    bank = FALSE
    angle = 0
    vy_final = vy_no_bank
  }
  else if (bank = TRUE)
  {
    angle = Bank_Angle_Estimate
  }
}
vy_dot_final = vy_dot − angle*conversion_factor
vy_final = integration of vy_dot_final
```

With reference to FIG. 1, an automotive control system 100 is implemented within a motor vehicle 10. As is shown in FIG. 1, a control unit 106 includes a processor 102, which is coupled to a memory subsystem 104, which includes an application appropriate amount of volatile and non-volatile memory. The processor 102 is also coupled to a yaw rate sensor 110, a lateral acceleration sensor 112, a longitudinal speed sensor 114 and a steering angle sensor 116. Based upon outputs of the sensors 110, 112, 114 and 116, the processor 102 provides a control signal to one or more motor vehicle actuators 40. It should be appreciated that the longitudinal speed of the motor vehicle 10 may be determined by a number of techniques. For example, the longitudinal speed sensor 114 may include a plurality of wheel speed sensors, whose outputs are utilized by the processor 102, implementing an algorithm to determine the speed of the motor vehicle 10. Alternatively, the processor 102 may determine the longitudinal speed of the motor vehicle 10 through implementation of a GPS receiver or other technique.

Figure 2A:
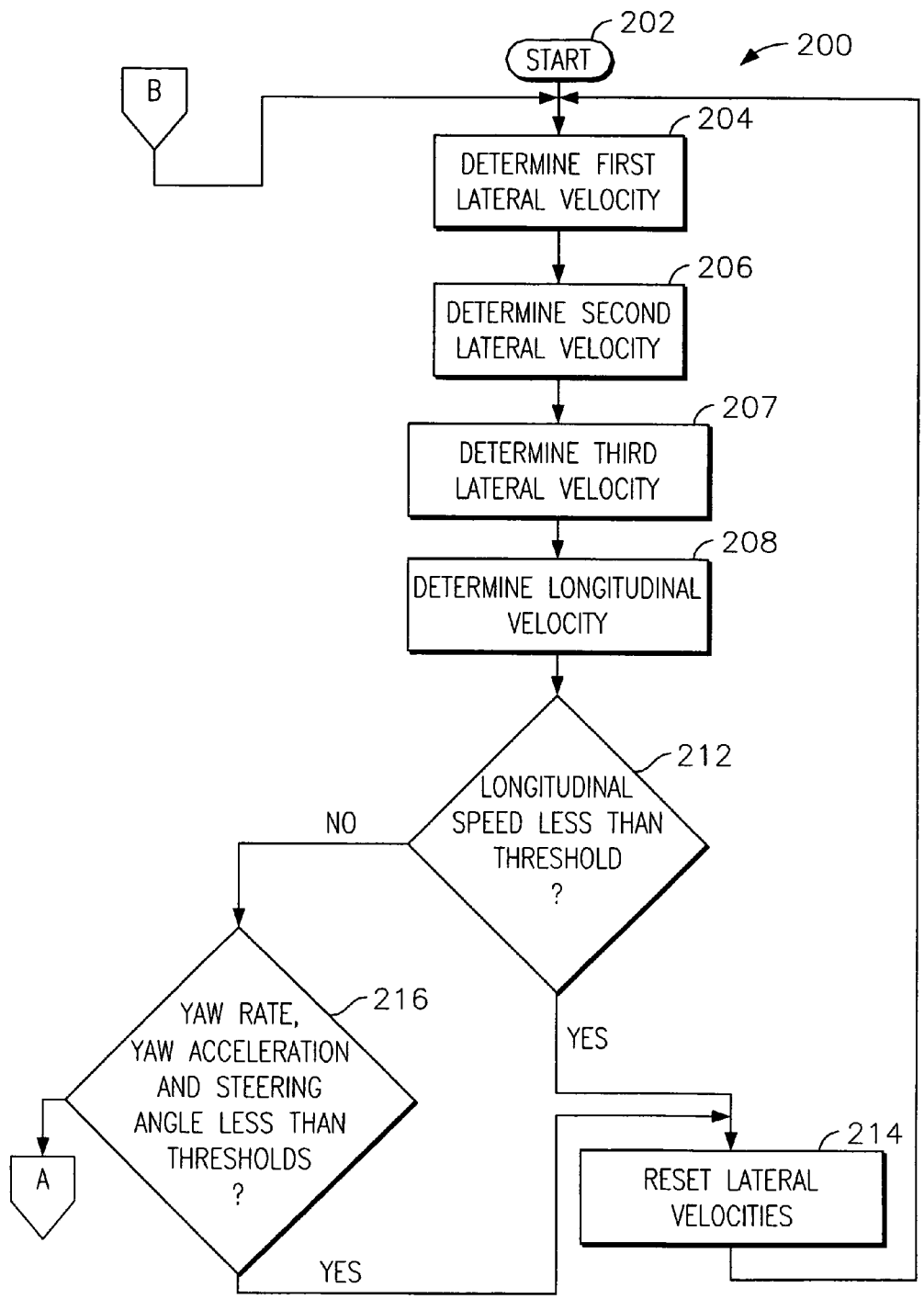
FIGS. 2A-2B depict an exemplary routine executed by the system of FIG. 1, according to various embodiments of the present invention.
Figure 2B:
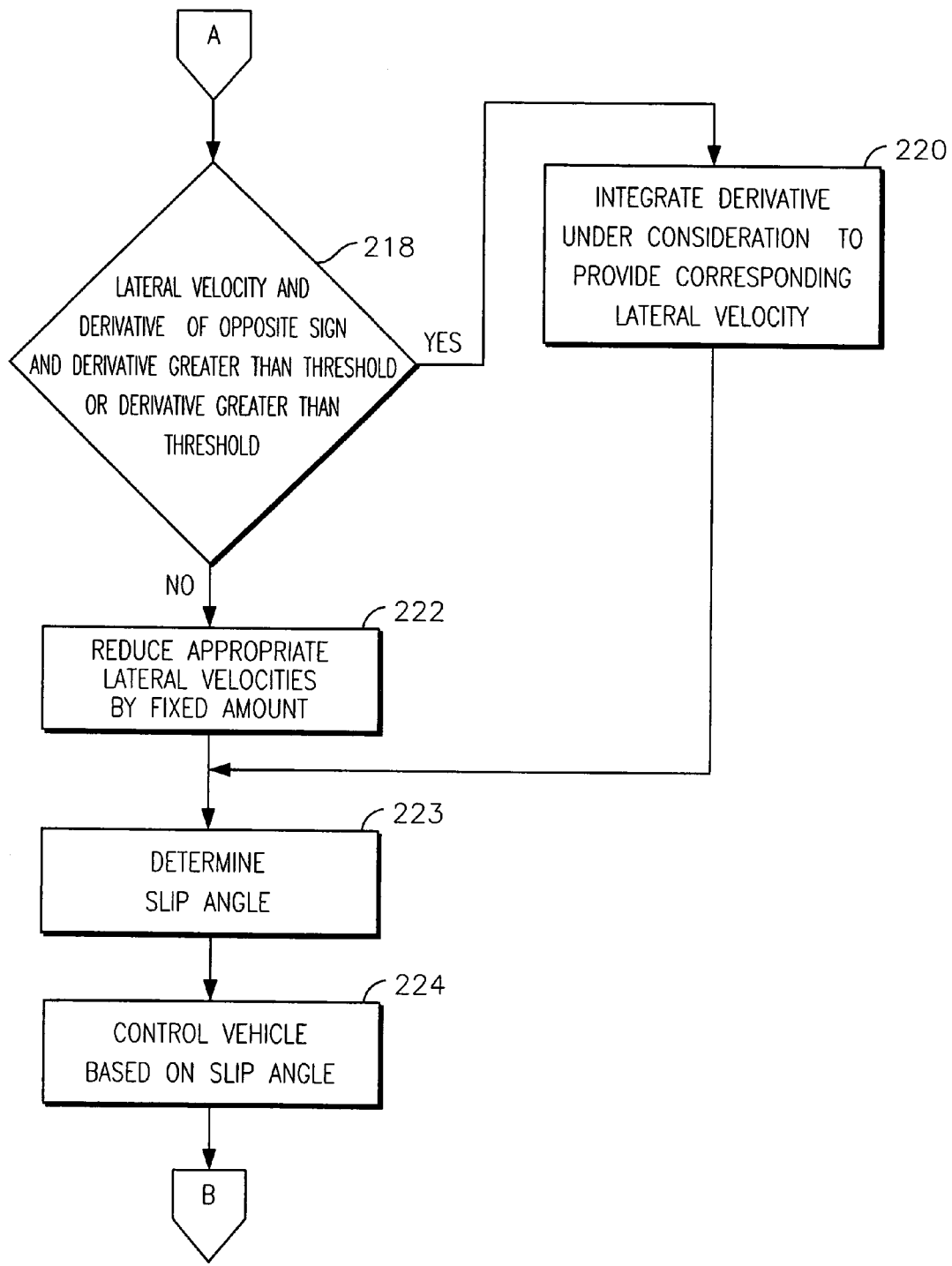

With reference to FIG. 2, a routine 200 is depicted, which implements a technique for determining a motor vehicle slip angle, while accounting for road banks encountered by the motor vehicle 10. In step 202, the routine 200 is initiated, at which point control transfers to step 204, where the processor 102 determines a first lateral velocity of the motor vehicle 10.

As is disclosed above, the lateral velocity is determined from vy_dot (vy_dot=ay−vx*yaw_rate) without consideration of road bank. Next, in step 206, after a predetermined time period, the processor 102 determines a second lateral velocity while considering a banked road (vy_dot=ay−vx*yaw_rate−bank_angle_estimate). In step 207, a third lateral velocity (vy_dot=ay−vx*yaw_rate−bank) is also determined. According to various embodiments of the present invention, the third lateral velocity is determined more often than the second lateral velocity.

Then, in step 208, the processor 102 determines the longitudinal velocity of the motor vehicle 10, based upon signals provided by the longitudinal speed sensor 114. As is disclosed above, the processor 102 then implements a routine, which utilizes the lateral acceleration signal ay (provided by the lateral acceleration sensor 112), the longitudinal speed vx of the motor vehicle 10 (as provided by the longitudinal speed sensor 114) and a yaw rate of the vehicle 10 (as provided by the yaw rate sensor 110). Signal values provided by the sensors 110, 112 and 114 are then utilized in the equation above. As is discussed above, the logic disclosed is utilized to improve the integration of the change in lateral velocity, vy_dot. Next, in decision step 212, the processor 102 determines whether the longitudinal speed vx is less than a threshold, e.g., 5 kph. If so, control transfers from step 212 to step 214, where the lateral velocities are reset. Otherwise, control transfers from step 212 to decision step 216.

In step 216, the processor 102 determines whether the yaw rate, yaw acceleration and steering angle are less than a desired threshold, e.g., 3 degrees per second, 100 degrees per second squared and 30 degrees, respectively. When the yaw rate, yaw acceleration and steering angle are all less than their respective thresholds, control transfers from step 216 to step 214, before returning control to step 204. Otherwise, control transfers from step 216 to decision step 218.

In decision step 218, the processor 102 determines whether the corresponding lateral velocity and lateral velocity derivative are of opposite sign and the lateral velocity derivative is greater than a threshold or if the derivative is simply greater than a threshold. If neither condition is satisfied, control transfers from step 218 to step 222, where the processor 102 causes the appropriate lateral velocities to be reduced by a fixed amount and then transfers control to step 223. Otherwise, control transfers from step 218 to step 220, where the processor 102 integrates the derivative under consideration into the corresponding lateral velocity and then transfers control to step 223. Then, in step 223, the processor 102 determines the slip angle β of the motor vehicle 10, by taking the inverse tangent of the lateral velocities vy divided by the longitudinal velocity vx of the motor vehicle 10. It should also be noted that, in practice, the inverse tangent is not really required but only a division, due to the linear nature of the inverse tangent function around zero. It should be appreciated that, as the lateral velocity increases, the slip angle β also increases and vice versa. From step 223, control transfers to step 224, where the processor 102 provides appropriate signals to the motor vehicle actuators 40, to control the vehicle 10, based on the slip angle β. The signals provided by the processor 102 may be provided through a brake subsystem, a steering wheel actuator and/or damping actuators that are part of the motor vehicle suspension system.

Accordingly, a technique for determining a slip angle of a motor vehicle has been described herein that advantageously accounts for a bank angle of the motor vehicle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for determining a slip angle of a motor vehicle while compensating for bank angle of the motor vehicle, comprising the steps of:
   determining a first lateral velocity of a motor vehicle, wherein the first lateral velocity is calculated without consideration of a bank angle and is derived from an integral of a first lateral velocity derivative;
   determining a second lateral velocity of the motor vehicle, wherein the second lateral velocity is calculated with consideration of the bank angle and is derived from an integral of a second lateral velocity derivative;
   determining a third lateral velocity of the motor vehicle, wherein the third lateral velocity is calculated with consideration of the bank angle and the first and second lateral velocities and is derived from an integral of a third lateral velocity derivative;
   determining a longitudinal velocity of the motor vehicle; and
   determining a slip angle of the motor vehicle, wherein the slip angle is based upon the third lateral velocity and the longitudinal velocity when a difference between the first lateral velocity and the second lateral velocity is greater than a lateral velocity threshold and the bank angle is greater than a bank angle threshold, and wherein the slip angle is based upon the first lateral velocity and the longitudinal velocity when a difference between the first lateral velocity and the second lateral velocity is less than the lateral velocity threshold or the bank angle is less than the bank angle threshold.

2. The method of claim 1, further comprising the step of:
   resetting the first, second and third lateral velocities when the longitudinal speed is less than a predetermined speed threshold for a predetermined time period.

3. The method of claim 2, further comprising the step of:
   resetting the first, second and third lateral velocities when a yaw rate of the motor vehicle is less than a predetermined yaw rate threshold, a yaw acceleration of the motor vehicle is less than a predetermined yaw acceleration threshold and a steering angle of the motor vehicle is less than a predetermined steering angle threshold for the predetermined time period.

4. The method of claim 3, wherein the predetermined yaw rate threshold is about 3 degrees per second, the predetermined yaw acceleration threshold is about 100 degrees per second squared, the predetermined steering angle threshold is about 30 degrees and the predetermined time period is about 1 second.

5. The method of claim 1, further comprising the step of:
   resetting the first, second and third lateral velocities when a yaw rate of the motor vehicle is less than a predetermined yaw rate threshold, a yaw acceleration of the motor vehicle is less than a predetermined yaw acceleration rate threshold and a steering angle of the motor vehicle is less than a predetermined steering angle threshold for the predetermined time period.

6. The method of claim 1, wherein the first, second, and third lateral velocities are only determined when a corresponding one of the lateral velocity derivatives of the motor vehicle is greater than a predetermined lateral velocity derivative threshold.

7. The method of claim 1, wherein the first, second, and third lateral velocities are only determined when a corresponding one of the lateral velocity derivatives of the motor vehicle is in an opposite direction of a corresponding one of the lateral velocities and a corresponding one of the lateral velocity derivatives is greater than a predetermined lateral velocity derivative threshold.

8. The method of claim 1, further comprising the step of:
   reducing the first, second and third lateral velocities by a fixed amount when a corresponding one of the lateral velocity derivatives of the motor vehicle is in the same direction of a corresponding one of the lateral velocities, a corresponding one of the lateral velocity derivatives is less than a predetermined lateral velocity derivative threshold and a yaw rate of the motor vehicle is less than a predetermined yaw rate threshold.

9. An automotive system for determining a slip angle of a motor vehicle while compensating for bank angle of the motor vehicle, comprising:
   a processor;
   a steering angle sensor coupled to the processor;
   a longitudinal speed sensor coupled to the processor;
   a lateral acceleration sensor coupled to the processor;
   a yaw rate sensor coupled to the processor; and
   a memory subsystem coupled to the processor, wherein the memory subsystem stores code that when executed by the processor instructs the processor to perform the steps of:

determining a first lateral velocity of a motor vehicle, wherein the first lateral velocity is calculated without consideration of a bank angle and is derived from an integral of a first lateral velocity derivative;

determining a second lateral velocity of the motor vehicle, wherein the second lateral velocity is calculated with consideration of the bank angle and is derived from an integral of a second lateral velocity;

determining a third lateral velocity of the motor vehicle, wherein the third lateral velocity is calculated with consideration of the bank angle and the first and second lateral velocities and is derived from an integral of a third lateral velocity derivative;

determining a longitudinal velocity of the motor vehicle, wherein the longitudinal velocity is determined from information provided by the longitudinal speed sensor;

determining a slip angle of the motor vehicle, wherein the slip angle is based upon the third lateral velocity and the longitudinal velocity when a difference between the first lateral velocity and the second lateral velocity is greater than a lateral velocity threshold and the bank angle is greater than a bank angle threshold, and wherein the slip angle is based upon the first lateral velocity and the longitudinal velocity when a difference between the first lateral velocity and the second lateral velocity is less than the lateral velocity threshold or the bank angle is less than the bank angle threshold; and controlling the motor vehicle based upon the slip angle.

10. The system of claim 9, wherein the memory subsystem stores additional code that instructs the processor to perform the additional step of:

resetting the first, second and third lateral velocities when the longitudinal speed is less than a predetermined speed threshold for a predetermined time period.

11. The system of claim 10, wherein the memory subsystem stores additional code that instructs the processor to perform the additional step of:

resetting the first, second and third lateral velocities when a yaw rate of the motor vehicle is less than a predetermined yaw rate threshold, a yaw acceleration of the motor vehicle is less than a predetermined yaw acceleration threshold and a steering angle of the motor vehicle is less than a predetermined steering angle threshold for the predetermined time period.

12. The system of claim 11, wherein the predetermined yaw rate threshold is about 3 degrees per second, the predetermined yaw acceleration threshold is about 100 degrees per second squared, the predetermined steering angle threshold is about 30 degrees and the predetermined time period is about 1 second.

13. The system of claim 9, wherein the memory subsystem stores additional code that instructs the processor to perform the additional step of:

resetting the first, second and third lateral velocities when a yaw rate of the motor vehicle is less than a predetermined yaw rate threshold, a yaw acceleration of the motor vehicle is less than a predetermined yaw acceleration rate threshold and a steering angle of the motor vehicle is less than a predetermined steering angle threshold for the predetermined time period.

14. The system of claim 9, wherein the first, second, and third lateral velocities are only determined when the corresponding lateral velocity derivative of the motor vehicle is greater than a predetermined lateral velocity derivative threshold.

15. The system of claim 9, wherein the first, second, and third lateral velocities are only determined when the corresponding lateral velocity derivative of the motor vehicle is in an opposite direction of the first and second lateral velocities and the lateral velocity derivative is greater than a predetermined lateral velocity derivative threshold.

16. The system of claim 9, wherein the memory subsystem stores additional code that instructs the processor to perform the additional step of:

reducing the first, second and third lateral velocities by a fixed amount when a corresponding one of the lateral velocity derivatives of the motor vehicle is in the same direction of a corresponding one of the lateral velocities, a corresponding one of the lateral velocity derivatives is less than a predetermined lateral velocity derivative threshold and a yaw rate of the motor vehicle is less than a predetermined yaw rate threshold.

17. A method for determining a slip angle of a motor vehicle while compensating for bank angle of the motor vehicle, comprising the steps of:

determining a first lateral velocity of a motor vehicle, wherein the first lateral velocity is calculated without consideration of a bank angle and is derived from an integral of a first lateral velocity derivative;

determining a second lateral velocity of the motor vehicle, wherein the second lateral velocity is calculated with consideration of the bank angle and is derived from an integral of a second lateral velocity derivative;

determining a third lateral velocity of the motor vehicle, wherein the third lateral velocity is calculated with consideration of the bank angle and the first and second lateral velocities and is derived from an integral of a third lateral velocity derivative;

determining a longitudinal velocity of the motor vehicle; and determining a slip angle of the motor vehicle, wherein the slip angle is based upon the third lateral velocity and the longitudinal velocity when a difference between the first lateral velocity and the second lateral velocity is greater than a lateral velocity threshold and the bank angle is greater than a bank angle threshold, and wherein the slip angle is based upon the first lateral velocity and the longitudinal velocity when a difference between the first lateral velocity and the second lateral velocity is less than the lateral velocity threshold or the bank angle is less than the bank angle threshold; and controlling the motor vehicle based upon the slip angle.

18. The method of claim 17, further comprising the step of:

resetting the first, second and third lateral velocities when the longitudinal speed is less than a predetermined speed threshold for a predetermined time period.

19. The method of claim 18, further comprising the step of:

resetting the first, second and third lateral velocities when a yaw rate of the motor vehicle is less than a predetermined yaw rate threshold, a yaw acceleration of the motor vehicle is less than a predetermined yaw acceleration threshold and a steering angle of the motor vehicle is less than a predetermined steering angle threshold for the predetermined time period.

20. The method of claim 19, wherein the predetermined yaw rate threshold is about 3 degrees per second, the predetermined yaw acceleration threshold is about 100 degrees per second squared, the predetermined steering angle threshold is about 30 degrees and the predetermined time period is about 1 second.

* * * * *

UNITED STATES PATENT AND TRADEMARK OFFICE
CERTIFICATE OF CORRECTION

PATENT NO.        : 7,668,637 B2
APPLICATION NO.   : 11/187491
DATED             : February 23, 2010
INVENTOR(S)       : Kevin Austin O'Dea It is certified that error appears in the above-identified patent and that said Letters Patent is hereby corrected as shown below:

Column 5, line 33: "vy_dot_bank=ay-vx*yaw_rate-bank_angel_angle_estimate" should read "vy_dot_bank=ay-vx*yaw_rate-bank_angle_estimate"

Signed and Sealed this

Eighteenth Day of May, 2010

David J. Kappos
*Director of the United States Patent and Trademark Office*